United States Patent
Nöthe et al.

(10) Patent No.: US 12,434,313 B2
(45) Date of Patent: Oct. 7, 2025

(54) WIRE ELECTRODE FOR SPARK-EROSION CUTTING AND METHOD FOR PRODUCING SAID WIRE ELECTRODE

(71) Applicant: Berkenhoff GmbH, Heuchelheim (DE)

(72) Inventors: Tobias Nöthe, Herborn (DE); Bernd Barthel, Steffenberg (DE); Stefan Rink, Herborn (DE)

(73) Assignee: BERKENHOFF GMBH, Heuchelheim (DE)

( * ) Notice: Subject to any disclaimer, the term of this patent is extended or adjusted under 35 U.S.C. 154(b) by 972 days.

(21) Appl. No.: 17/595,148

(22) PCT Filed: May 8, 2020

(86) PCT No.: PCT/EP2020/062930
§ 371 (c)(1),
(2) Date: Nov. 10, 2021

(87) PCT Pub. No.: WO2020/229365
PCT Pub. Date: Nov. 19, 2020

(65) Prior Publication Data
US 2022/0212277 A1  Jul. 7, 2022

(30) Foreign Application Priority Data

May 10, 2019 (EP) .................................. 19173932
Jan. 10, 2020 (EP) .................................. 20151302

(51) Int. Cl.
*B23H 7/08* (2006.01)
*C22C 9/04* (2006.01)
*C22F 1/08* (2006.01)

(52) U.S. Cl.
CPC ............ *B23H 7/08* (2013.01); *C22C 9/04* (2013.01); *C22F 1/08* (2013.01)

(58) Field of Classification Search
CPC ...... C22C 9/04; C22F 1/02; C22F 1/08; B21C 1/02; B23H 7/08; B23H 1/04; B23H 1/06
(Continued)

(56) References Cited

U.S. PATENT DOCUMENTS

2006/0219666 A1 * 10/2006 Shin .................. B23H 7/08
219/69.12

FOREIGN PATENT DOCUMENTS

| DE | 69205758 T2 | 4/1996 |
|---|---|---|
| EP | 0526361 B1 | 2/1993 |
| WO | WO 2013/037336 | 3/2013 |

OTHER PUBLICATIONS

"Lever Rule", 3 pages, Nov. 28, 2018 ed., Wikipedia (as edited by Leschenei), online, https://en.wikipedia.org/w/index.php?title=Lever_rule&oldid871067368).
(Continued)

*Primary Examiner* — Vy T Nguyen
(74) *Attorney, Agent, or Firm* — NORTON ROSE FULBRIGHT US LLP

(57) ABSTRACT

The invention relates to a wire electrode for spark-erosion cutting, comprising a core (2), which has a metal or a metal alloy, and a sheath (3, 4, 6), which surrounds the core (2) and comprises one or more sheath layers (3, 4, 6), one of which comprises regions (3) having a morphology corresponding to block-like particles, which are spatially separated, at least over part of their periphery, from one another, from the material of the layer comprising said regions, from the material of one or more other layers and/or from the core material by cracks, characterized in that, in a wire cross-section, viewed perpendicularly or parallel to the wire longitudinal axis, more than 50% of the surface area of a region having the morphology of a block-like particle has a copper-zinc alloy with a zinc concentration of 38 to 49 wt. %. There is optionally a thin cover layer on the block-like
(Continued)

particles, which cover layer consists of more than 50 wt. % zinc oxide with a thickness of 0.05 to 2 μm. Said cover layer has regions in which the copper-zinc alloys that the block-like particles have emerge at the surface. The invention also relates to a method for producing said wire electrode.

26 Claims, 9 Drawing Sheets

(58) Field of Classification Search
USPC .......................................... 219/69
See application file for complete search history.

(56) References Cited

OTHER PUBLICATIONS

Anonymous, "Third party observation for European Application No. 20723174.7", Jun. 5, 2023, 3 pages.
Examination report received in corresponding European Application No. 20723174.7 received on Dec. 1, 2023, 8 pages. (German Only).
Response to European Examination Report for European Application No. 20723174.7, dated May 30, 2024, 15 pages. (German only).
Third Party Submission filed in U.S. Appl. No. 17/595,148, dated Sep. 27, 2024, 30 pages.
International Preliminary Report on Patentability issued in Corresponding PCT Application No. PCT/EP2020/068023, dated Dec. 28, 2021 (English Translation provided).
International Search Report and Written Opinion for PCT/EP2020/062930 issued Jul. 23, 2020.
Office Action issued in corresponding Indian Patent Application No. 202127051790, dated Mar. 17, 2025.
"Lever rule," 3 pages, Nov. 28, 2018 ed., Wikipedia (as edited by Leschnei), online (https://en.wikipedia.org/w/index.php?title=Lever_rule&oldid871067368).†
Jaeger (Primary Examiner), "Communication pursuant to Article 94(3) EPC" with "Annex," 8 pages, Dec. 1, 2023, EPO, online (register.epo.org)—English Translation Included.†
Anonymous, "Third Party Observation for application No. EP20200723174," 3 pages, Jun. 5, 2023, online (register.epo.org).†
Nohlen (Patent Att'y), "Reply to Communication from the Examining Division" with "Amended Claims," 18 pages, May 30, 2024, online (register.epo.org)—English Translation Included.†

* cited by examiner
† cited by third party

WIRE ELECTRODE FOR SPARK-EROSION CUTTING AND METHOD FOR PRODUCING SAID WIRE ELECTRODE

CROSS-REFERENCE TO RELATED APPLICATIONS

This application is a national phase application under 35 U.S.C. § 371 of International Application No. PCT/EP2020/062930 filed May 8, 2020, which claims the benefit of priority of European Patent Application No. 20151302.5 filed Jan. 10, 2020, and European Patent Application No. 19173932.5 filed May 10, 2019. The contents of the referenced applications are incorporated into the present application by reference.

FIELD OF THE INVENTION

The present invention relates to a wire electrode for spark-erosion cutting and a method for the production thereof.

STATE OF THE ART

Spark-erosion methods (Electrical Discharge Machining, EDM) are used for separating electrically conductive workpieces and are based on the removal of material by means of spark discharges between the workpiece and a tool. For this purpose, in a dielectric liquid such as, for example, deionized water or oil, controlled spark discharges are produced between the respective workpiece and the tool, which is arranged at a short distance therefrom and which acts as an electrode, through the application of voltage pulses. In this manner, workpieces which consist, for example, of metals, electrically conductive ceramics or composite materials etc. can be machined substantially irrespective of their hardness. The electrical energy for the spark discharges is provided by the pulse generator of the eroding machine.

A special spark-erosion method, in which the tool is constituted by a tensioned, thin wire having typical diameters in a range of from approximately 0.02 to 0.4 mm, is spark-erosion cutting or wire erosion. As the wire wears during the eroding process as a result of the removal of material, it has to be continuously drawn through the cutting or machining zone and can only be used once, i.e. the wire is consumed continuously. The desired cutting contour is carried out through a so-called main cut with relatively high discharge energy first. To improve the contour precision and the surface roughness of the workpiece, the main cut can be followed by one or more so-called trim cuts with successively reduced discharge energy. During these trim cuts the wire electrode is engaged only with a portion of its circumference.

In practice, use is made of both coated and uncoated wires or wire electrodes, which nowadays are usually produced on the basis of brass or copper. Uncoated wire electrodes, which are also referred to as bare wires, consist of a homogeneous material, while coated wire electrodes have a covered or coated core. In the state of the art, coated wire electrodes are normally constructed such that a jacket or covering, which can be composed of one covering layer or several covering layers arranged one on top of another, is responsible for the actual erosion process, whereas the core of the wire electrode, for example, imparts the tensile strength, necessary for the through-passage of the wire and for the wire pre-tensioning, and the necessary electrical and thermal conductivity.

Bare wires typically consist of brass with a zinc proportion of between 35 and 40 wt.-%, whereas most coated wires have a core of copper or brass and one or more covering layers of zinc or a copper-zinc alloy. As materials involved in the actual eroding process, zinc and brass, owing to the presence of zinc, with its low vaporization temperature, offer the advantages of a relatively high removal rate and efficiency of the eroding process and the possibility of the transfer of very small pulse energies for the fine finishing of workpiece surfaces, i.e. machining generating surface roughnesses as small as possible. Against this background, for the purpose of fine finishing, wire electrodes which have a covering layer which consists predominantly or exclusively of zinc are often used.

It is known that, compared with bare wires, the removal rate or cutting performance can therefore be increased by using wires which are provided with a coating of pure or predominantly pure zinc. Furthermore, it is known that a thin top layer, e.g. of zinc oxide or cadmium oxide, is advantageous for the cutting performance of a wire electrode (cf. U.S. Pat. No. 4,977,303). Moreover, it is known that wires with a coating of brass containing β or β' phase in turn achieve a higher cutting performance than the above-mentioned zinc-coated wires, as the zinc bound in the β or β' brass alloy vaporizes more slowly compared with pure zinc, and is thus available to promote removal for long enough while the wire is passing through the cutting or machining zone. Furthermore, the zinc content of the covering can be further increased using wires which have a coating of the γ phase and/or the ε phase of the brass, and in principle identical or higher cutting performances can be achieved compared with the above-mentioned wires with a coating of β or β' brass.

To achieve high cutting performances, it has proved to be advantageous to produce a coating from a brittle alloy, such as e.g. brass in the γ phase, in a diameter that is larger than the final diameter through diffusion, and then to draw it to the final dimension by cold forming. As a result, the brittle-hard layer breaks open, with the result that indentations and continuous cracks form in it and the material located underneath comes through (cf. U.S. Pat. Nos. 5,945,010, 6,303,523). The cracks and indentations increase the surface area of the wire. The latter is thereby better cooled by the surrounding dielectric, and the removal of removed particles from the gap is also promoted. Aside from that, discharges preferably form at the edges produced by the cracks due to the excessive increase of the electrical field. This promotes the ignitability of the wire electrode, and thus the cutting performance.

This and further developments for increasing the cutting performance are also based on combinations of different ones of the named covering layers, optionally with further layers, in a covering constructed multi-layered. Occasionally, sometimes compulsorily owing to diffusion processes which take place during the corresponding production processes, jackets which have a brass covering layer with a phase mixture of for example α and β phase or of β and γ phase have also been proposed here.

In U.S. Pat. No. 7,723,635 a wire electrode is proposed which has a core and a first covering layer of a brass alloy with approx. 37-49.5 wt.-% zinc, wherein uniformly distributed so-called grains, which are spaced apart from each other and which contain a brass alloy with a zinc proportion of approx. 49.5-58 wt.-% zinc, are present embedded in the covering layer. With such a wire electrode, the eroding properties are to be enhanced on the basis of improved electrical conductivity and strength.

According to EP-A-2 193 876 at least one of several covering layers has predominantly a fine-grained mixture of β and γ brass. Through the incorporation of the γ brass in a matrix of β brass, the γ brass will not wear too quickly during the eroding process, but will be released into the eroding gap in small doses in an effective manner in terms of removal.

In EP-A-1 846 189 a wire electrode is proposed which contains a first layer of β brass as well as a torn layer of γ brass, in the holes of which the layer of β brass emerges.

EP-A-2 517 817 describes a wire electrode with two alloy layers formed by diffusion. The core wire material emerges along cracks in the second alloy layer, with the result that a plurality of grain-like structures are formed on the surface.

However, in connection with coatings of brittle phases like the γ phase, it has been shown that, on the one hand, an increase in the layer thickness does not necessarily lead to a further increase in performance (cf. EP-A-1 295 664) and, on the other hand, limits are set on the formability of thicker layers with regard to economic producibility (cf. U.S. Pat. No. 5,945,010). Furthermore, γ brass coatings have a greater spark-erosion wear than β brass coatings, with the result that in practice the cutting performance frequently decreases again.

Although very high cutting performances can be achieved using coated wire electrodes with a relatively large layer thickness of e.g. 10-30% of the wire diameter, which consist predominantly (cf. EP-A-1 295 664) or completely (cf. EP-A-1 455 981) of β brass, this is only in combination with a high performance set on the generator side. However, as a rule, this leads to a loss of contour precision on the machined component.

KR-A-10-2007-0075516 discloses, among other things, a method for producing a wire electrode with a predetermined thickness of the diffusion layer. During the coating of a core wire of copper, a copper alloy or a copper-plated steel wire by hot dipping, the wire is to be prevented from stretching and thus the thickness of the diffusion layer forming is to be prevented from being uncontrollable. In a first step, a core wire of copper, a copper alloy or steel is coated with a first metal, which has a lower vaporization temperature than copper. In order to prevent a stretching of the wire during the coating, a dimension of between 2 and 4 mm is preferably chosen instead of a dimension of the core wire of e.g. 0.90 mm. In a second step, the coated core wire is heat-treated in order to produce an alloy layer owing to diffusion. The heat treatment for producing the diffusion layer can alternatively be effected in the course of the coating. In a third step, the wire is drawn. In a fourth step, the wire is heat-treated again, in order to continue the diffusion and to bring about a recrystallization. In a fifth step, the wire is coated with a second metal, which has a lower vaporization temperature than copper. In a sixth step, the wire coated with the second metal is drawn and, in a seventh step, the wire is heat-treated to stabilize it.

OBJECT OF THE INVENTION

An object of the invention is to increase the economic viability of the wire-eroding technique by further increasing the cutting performance and the erosion resistance.

A further object of the invention is not to impair the contour precision and the surface quality of the workpiece machined by spark-erosion compared with bare brass wires, or even to improve them, despite an increased cutting performance.

In addition, an object of the invention is to provide a coated wire electrode for achieving high cutting performances with a straightness and bending stiffness that are as great as possible, with the result that the automatic threading processes proceed unimpeded on the eroding machines even under difficult conditions, such as e.g. tall workpieces.

Furthermore, an object of the invention is to provide a coating that is as abrasion-resistant as possible, in order that the eroding processes carried out with the wire electrode according to the invention do not experience any disruptions or impairments due to deposits of wire wear debris.

Finally, an object of the invention is to provide a wire electrode for achieving high cutting performances which has a longer life of the wire guides and electrical contacts of the eroding machine, even compared with wire electrodes with a high cutting performance.

SUMMARY OF THE INVENTION

To achieve this object, a wire electrode with the features of claim 1 is used. To produce the wire electrode according to the invention, the method with the features of claim 23 is used. Advantageous embodiments of the wire electrode are the subject of the respective dependent claims.

DETAILED DESCRIPTION OF THE INVENTION

Figure 1:
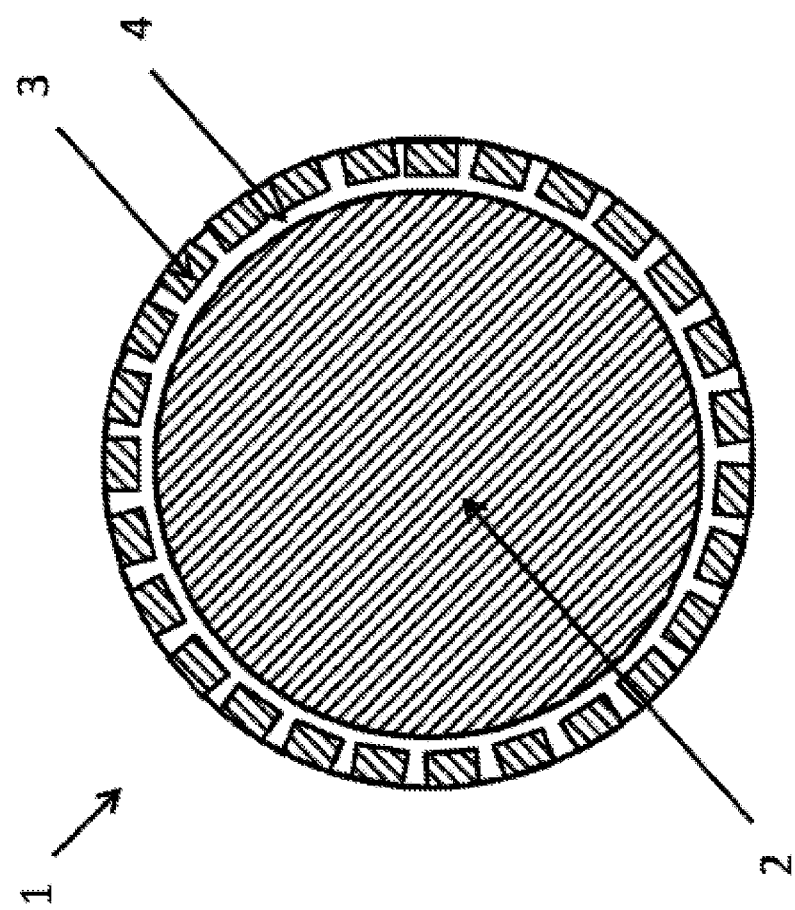
FIG. 1 shows, schematically and not to scale, a cross section (perpendicular to the longitudinal axis) of a first embodiment of the wire electrode according to the invention.

According to the present invention, it is provided that a wire electrode for spark-erosion cutting has a core which contains a metal or a metal alloy. It is preferred that the core consists of one or more metals and/or one or more metal alloys to an extent of more than 50 wt.-% and more preferably completely or substantially completely. In particular, the core can therefore be formed altogether of one metal or of one metal alloy. The core can be formed homogeneous or, for example in the form of several individual metal or metal alloy layers of different composition arranged one on top of another, have properties that vary in the radial direction. As used herein, "substantially" means that the wire according to the invention or a layer thereof, or its core, consists of the respectively disclosed composition and/or has the disclosed properties, wherein production and measurement tolerances are to be taken into account, e.g. the presence of unavoidable impurities, which are familiar to experts.

The metal is in particular copper and the metal alloy is in particular a copper-zinc alloy.

Surrounding the core, for example in the form of a coating, a jacket (also called "covering" in the following) is provided, which comprises one or more covering layers. The covering wears during a wire-eroding process and is provided to influence the eroding properties. In the case of several covering layers, these are arranged one on top of another in the radial direction, and each one preferably runs around the core.

One of the covering layers of the wire electrode according to the invention comprises regions which have a particulate appearance (morphology) which is characterized in particular by an irregular contour which (viewed in a wire cross section perpendicular or parallel to the wire longitudinal axis) contains sometimes sharp corners with a corner radius of less than 2 µm and lines with a straightness which deviates by less than 2 µm from an ideal straight line. These regions are therefore described as regions the morphology of which corresponds to block-like or block-shaped particles. These regions are also called "regions with block-like morphology" or, for short, "block-like particles" (or "block-shaped particles") in the following. The material of adjacent layers and/or the adjacent or radially further inwardly lying core material can come through between the block-like particles. The block-like particles are additionally spatially separated, at least over a portion of their circumference, from each other, from the material of the layer which comprises these regions, the material of adjacent layers and/or the core material by cracks. The block-like particles themselves can contain cracks.

The cracks generally have a width of up to approximately 2 µm, predominantly approximately 1 µm, as can be determined by means of scanning electron microscopy under usual conditions, e.g. by analysis of an image measured on the basis of backscattered electrons (20 kV). If a larger crack width appears along the course of a crack over a short distance (e.g. 1 to 2 µm), this structure is likewise regarded as a crack within the meaning of the present invention. In comparison, wider spaces between the block-like particles (which usually form radially inwards from the outer surface of the wire) are called indentations or gaps.

Along the cracks, but also along the indentations and gaps, zinc oxide can form depending on the manner of production of the wire according to the invention, which can reduce the width of the cracks or sometimes entirely fill their volume. However, this can likewise be represented by means of suitable scanning electron microscopy recording techniques, with the result that the morphology of the block-shaped particles determined by the crack formation can also be recognized in this case.

Viewed in a wire cross section, perpendicular or parallel to the longitudinal axis of the wire (also called "wire longitudinal axis" or, for short, only "wire axis" herein), the predominant portion, i.e. amounting to more than 50%, of the surface area of the block-like particles contains a copper-zinc alloy with a zinc concentration of 38-49 wt.-%. According to the phase diagram for the CuZn system, the alloy is present in this portion of the surface area partially or predominantly as β and/or β' phase. The portion of the surface area of the block-like particles amounting to less than 50% contains a copper(-zinc) alloy with a zinc concentration of more than 49-68 wt.-%. According to the phase diagram for the CuZn system, the alloy is present in this portion of the surface area as β+γ phase and/or as γ phase.

If a block-like particle is not completely separated from its surroundings by cracks, the surface area used to determine the composition of the particle is defined by taking as the limit the shortest straight connecting line between the ends of the cracks which (partially) separate the particle from the surroundings, wherein the ends which lie closest to the wire centre in the radial direction (thus the radially innermost) are chosen. This is shown by way of example in FIGS. 6 and 7, to which reference is made here within the framework of this definition.

If a particle is separated from its surroundings not only by cracks, but (also) by an indentation (gap), the connecting line between the crack end and the radially innermost lying point of the nearest indentation (gap) seen from one crack end is chosen. This is likewise shown by way of example in FIG. 7, to which reference is made here within the framework of this definition.

Preferably, at least a portion of the block-like particles according to the invention, viewed in a wire cross section perpendicular or parallel to the longitudinal axis of the wire (as defined above), is completely separated from the surroundings, i.e. from each other, from the material of the layer which comprises these particles, the material of one or more layers and/or the core material, by cracks.

In connection with the presence of β/β' phase, it should be borne in mind that the r phase is stable below a certain temperature and has an ordered lattice with defined lattice sites for the copper and the zinc and, if this temperature is exceeded, passes into the unordered β phase, in which the atoms are distributed statistically onto the lattice sites of a body-centred cubic lattice. As, according to prevailing opinion, the conversion between β phase and β' phase cannot be suppressed and also has only a minor impact on the mechanical and electrical properties thereof, a general reference to the β phase also always means the β' phase within the framework of this application, unless a distinction is expressly made.

Furthermore, it should be pointed out that the block-like particles can have a plurality of grains in the metallurgical sense.

The block-like particles can contain zinc oxide along the cracks and gaps which, over a portion of their circumference, spatially separate them from each other, from the material of the layer which comprises these particles, the material of adjacent layers and/or the (adjacent) core material, as well as along the cracks which the block-like particles themselves contain.

The copper-zinc alloys which contain the block-like particles can contain, in addition to copper and zinc, one or more metals from the group of Mg, Al, Si, Mn, Fe, Sn, with a total proportion of from 0.01 to 1 wt.-%.

The thickness of the block-like particles, measured in the radial direction of a wire cross section, is preferably 1 to 30 µm.

The wire electrode can additionally have a thin top layer, which consists predominantly of Zn, a Zn alloy, or ZnO in a thickness of for example from approximately 0.05-1 µm.

According to a further embodiment of the invention, there can additionally be a thin top layer which contains predominantly, i.e. to an extent of more than 50 wt.-%, zinc oxide in a thickness of for example from approximately 0.05-2 µm on the block-like particles. This top layer has regions ("holes") in which the material of the block-like particles, i.e. one of the copper-zinc alloys which are contained in the block-like particles, emerges.

Viewed perpendicularly (radially) to the wire surface, these regions have a lamellar structure, such that lamellae formed of the top layer, which contains predominantly zinc oxide, and lamellae formed of the material of the block-like particles are arranged succeeding each other in an alternating manner. Such regions are represented by way of example in FIGS. 8 and 9.

By lamellae is usually meant structures which are characterized by small plates or thin layers which are located in a structure of homogeneously arranged parallel or radial structure elements of this type (small plates/thin layers). In this embodiment of the wire electrode according to the invention, the lamellar structure regions are not arranged strictly parallel and the distance between the individual lamellae can also vary. Nevertheless, for experts in this field, it is clear what is meant by lamellar. In this respect, a comparison can be made with the known lamellar graphite. Lamellar graphite describes the most common type of cast iron, in which graphite is present in the form of thin, irregularly shaped lamellae.

Figure 8:
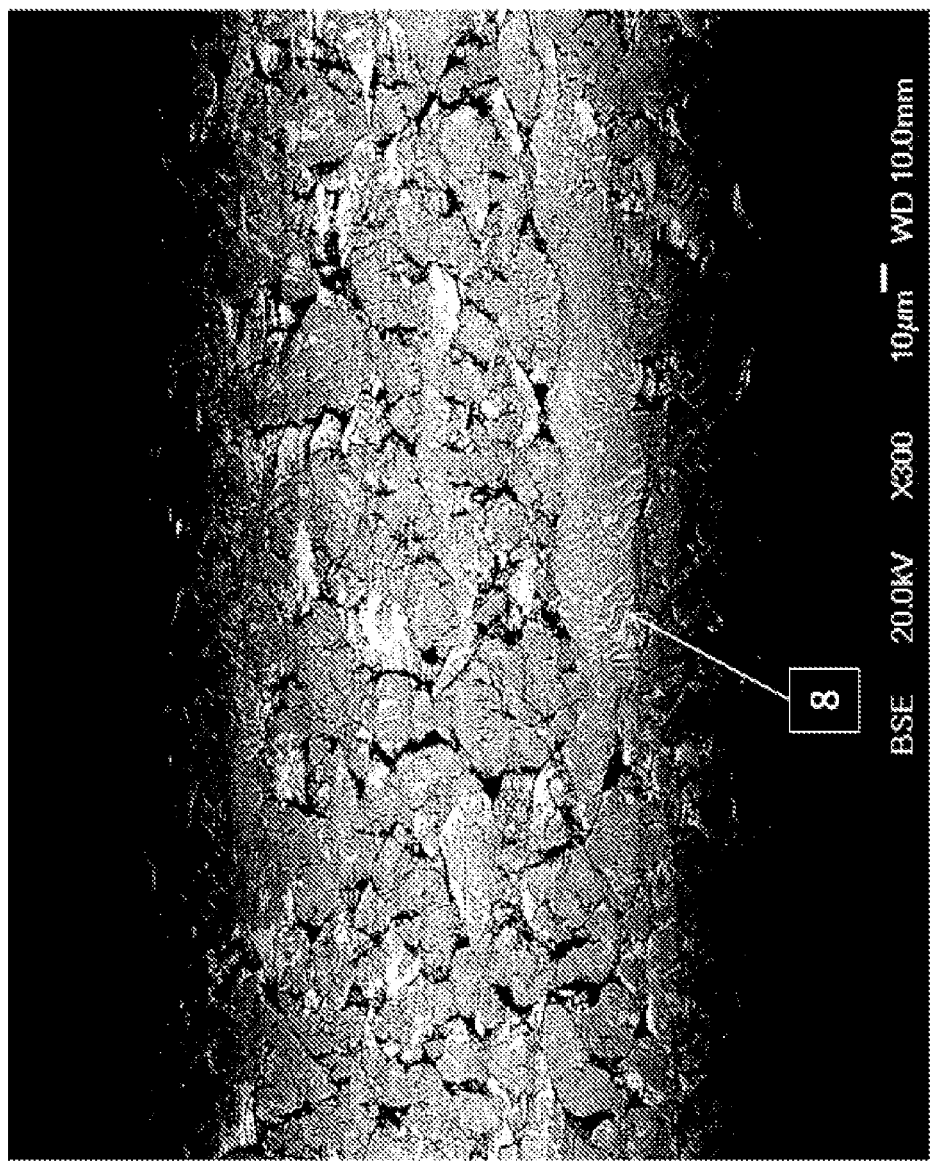
FIG. 8 shows an SEM picture (backscattered electrons, 20 kV) of the surface of a further embodiment of the wire electrode according to the invention with a magnification of 300.
Figure 9:
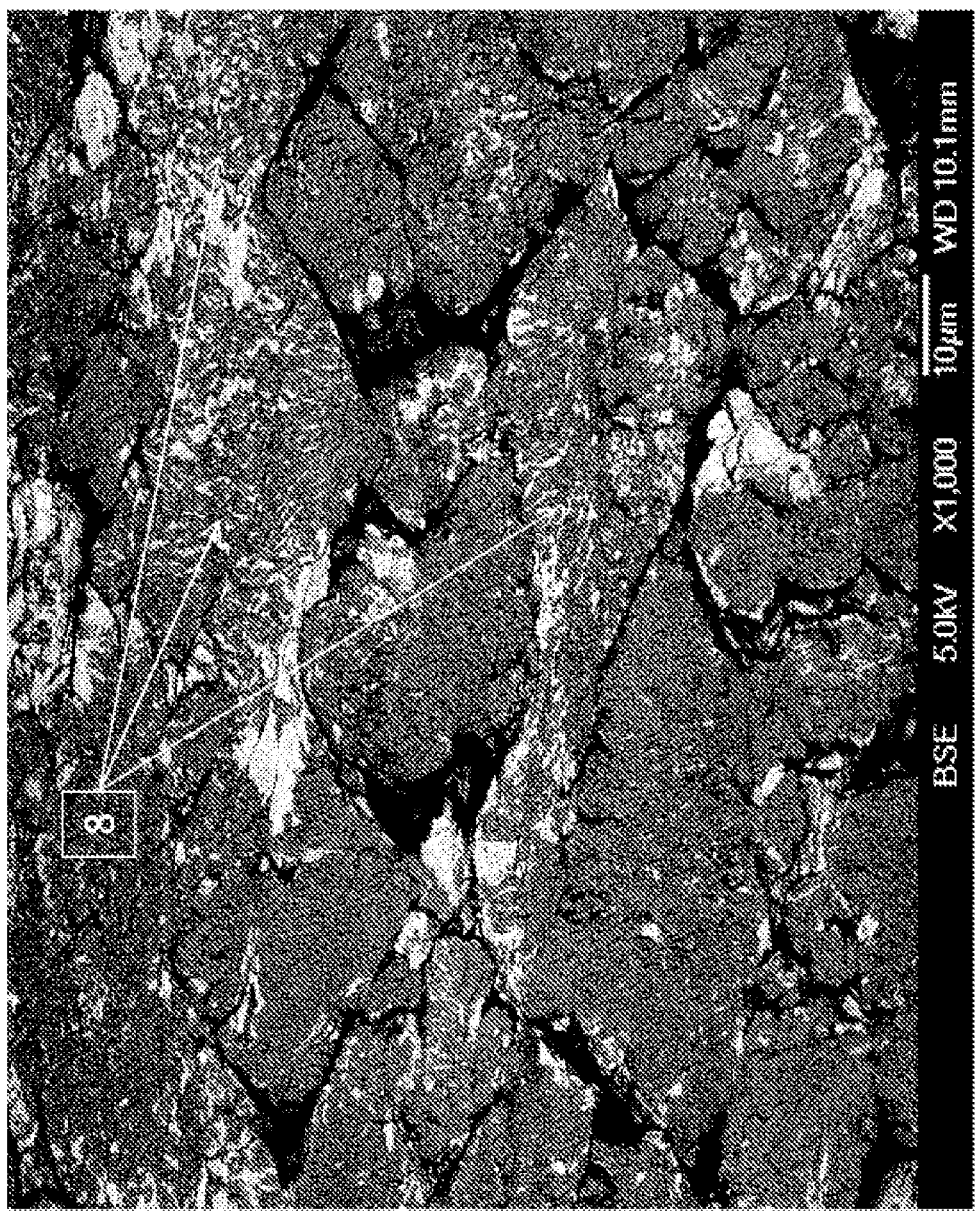
FIG. 9 shows an SEM picture (backscattered electrons, 5 kV) of the surface of a further embodiment of the wire electrode according to the invention with a magnification of 1000.

The lamellar structure elements which appear as whitish, lighter regions in FIGS. 8 and 9 consist of the material of the block-like particles. The lamellar regions which appear as greyish, darker regions consist of the top layer of (predominantly) zinc oxide.

The dimensions of the lamellar structures (also called "lamellae" for short in the following) are as follows.

The width of the lamellae which are formed of the material of the block-like particles is less than 5 µm, preferably less than 3 µm and still more preferably less than 2 µm. The length of the lamellae can be up to 50 µm. The width of the lamellae can vary over their length. These specifications relate to the lamellae which are formed of the material of the block-like particles and appear as whitish, lighter regions in FIGS. 8 and 9.

The lamellae which are formed of the material of the block-like particles can be connected to each other in part by narrow strips, with the result that a net-like structure made of the material of the block-like particles is formed on the wire surface.

Relative to a unit area of 50×50 µm$^2$ in an SEM picture (backscattered electrons, 20 kV) in a top view onto the wire along its longitudinal axis (i.e. in a view as shown in FIGS. 8 and 9), the lamellae which are formed of the material of the block-like particles can account for a proportion of up to 50%.

The metals contained in the core and the coating can have unavoidable impurities.

According to the state of the art, it was to have been expected that a wire electrode with a broken-open layer which consists predominantly of γ phase, owing to the higher zinc concentration compared with a layer with comparable topography which consists predominantly of β phase, would lead to a higher cutting performance. However, it has surprisingly proved that with the wire electrode according to the invention, compared with previously known wires, the cutting performance and the resistance to erosion wear can simultaneously be substantially increased.

The cracks which spatially separate the block-like particles, at least over a portion of their circumference, from each other, from the material of the layer which contains these particles, the material of adjacent layers and/or the (adjacent) core material, and the cracks which the block-like particles themselves can contain, promote excessive increases in the electrical field, and thus the ignitability of the electrode. Through the high spark-erosion wear resistance owing to the zinc content of 38-49 wt.-% in their predominant portion, the block-like particles can contribute to a higher ignitability for a longer duration. This effect becomes positively noticeable in particular when the wire electrode according to the invention is used in the first 2 trim cuts, as the block-like particles are effective in terms of removal for even longer due to the discharge energy, which is successively reduced compared with the main cut.

The cooling of the wire electrode is generally also improved due to the increased surface area owing to the fissured layer.

Zinc oxide on the surface formed by the cracks and indentations (gaps) which spatially separate the block-like particles, over a portion of their circumference, from each other, from the material of the layer which contains these particles, the material of adjacent layers and/or the (adjacent) core material, as well as on the surface formed by the cracks which the block-like particles themselves contain, leads to a further increase in the cutting performance.

In addition, the cutting performance is increased by the top layer of zinc oxide which has holes in which the material of the block-like particles emerges. In particular, a lamellar surface structure as defined above, in which lamellae formed of the top layer, which contains predominantly zinc oxide, and lamellae formed of the material of the block-like particles are arranged next to each other in an alternating manner, has an advantageous effect on the cutting performance.

The thickness of the block-like particles, measured in the radial direction of a wire cross section perpendicular to the longitudinal axis, advantageously lies in a range of 1-30 µm. In the case of thicker particles, there is the danger that whole particles will break off owing to insufficient binding to the adjacent wire core or the adjacent covering layer. This can lead to short circuits, and thus to the impairment of the contour precision and surface quality of the eroded component. In the case of thicknesses of less than 1 µm, the positive effects of the ignitability and the cooling action are no longer sufficiently given. The thickness of the block-like particles, measured in the radial direction of a wire cross section, is more preferably 2-15 µm and still more preferably 3-10 µm.

The covering layer can, for example, be applied to the core using suitable coating methods, optionally in combination with a heat-treatment method. The application of the covering layer can be effected for example physically or electrochemically, and it can optionally also be followed by steps for reducing the wire diameter. Thus, for example, it is possible to proceed from an initial material in the form of a wire of Cu, CuZn$_{20}$ or CuZn$_{37}$ (brass with 20 or 37 wt.-% zinc) with a diameter of e.g. 1.20 mm, which is coated with Zn, for example by electrodeposition or by hot dipping. The wire coated with Zn is then subjected to a diffusion annealing, in which a covering layer is produced which has an at least partial and in particular continuous and homogeneous partial layer of γ brass. The zinc content in this portion of the covering layer is accordingly 58-68 wt.-%. In a next step, the wire is preferably tapered to an intermediate dimension or the final dimension by cold forming. Here, the brittle-hard layer of brass in γ phase tears, with the result that block-like particles form. The block-like particles are spatially separated from each other, with the result that the material of adjacent layers and/or the (adjacent) core material can emerge between the block-like particles. The block-like particles themselves can contain cracks.

Then, the wire is subjected to a further diffusion annealing, with the result that the predominant portion, i.e. amounting to more than 50%, of the block-like particles has a zinc content of 38-49 wt.-%. The determination of the composition is performed in relation to a wire cross section viewed perpendicular or parallel to the wire axis. The particle surface area viewed is thus as defined above.

The portion of the block-like particles with the composition according to the invention preferably lies in the region of the block-like particles radially facing the core. The portion of the block-like particles amounting to less than 50% contains a copper alloy with a zinc concentration of more than 49-68 wt.-%. Due to the diffusion of the zinc from the block-like particles into the adjacent material, a diffusion layer with a zinc content of 38-58 wt.-% forms. The size of the portion of the block-like particles which has a zinc content of 38-49 wt.-% can be influenced via the intensity, i.e. the temperature and duration, of the annealing.

The two diffusion annealings can be carried out both in a stationary manner, e.g. in a hood-type furnace, and in a continuous process, e.g. by resistance heating. The first diffusion annealing can be carried out e.g. in a hood-type furnace under ambient atmosphere or protective gas, preferably in a range of 180-300° C., for 4-12 h, wherein the average heating rate is preferably at least 80° C./h and the average cooling rate is preferably at least 60° C./h. It can alternatively be effected e.g. by resistance heating in a continuous pass under ambient atmosphere or protective gas, wherein the average heating rate is preferably at least 10° C./s, the max. wire temperature preferably lies between 600 and 800° C., the annealing time preferably lies in the range of 10-200 s and the average cooling rate is preferably at least 10° C./s. The above annealing times relate to the period of time from when room temperature is departed from to when room temperature is reached again. The second diffusion annealing can be carried out e.g. in a hood-type furnace under ambient atmosphere or protective gas, preferably in a range of 300-520° C., for 4-24 h, wherein the average heating rate is preferably at least 100° C./h and the average cooling rate is preferably at least 80° C./h. It can alternatively be effected e.g. by resistance heating in a continuous pass under ambient atmosphere or protective gas, wherein the average heating rate is preferably at least 10° C./s, the max. wire temperature preferably lies between 350 and 600° C., the annealing time preferably lies in the range of 10-200 s and the average cooling rate is at least 10° C./s. The above annealing times relate to the period of time from when room temperature is departed from to when room temperature is reached again. Due to the annealing under ambient atmosphere or in the presence of oxygen, a thin top layer of predominantly zinc oxide, as defined above, with a thickness of 0.05-2 μm can be produced on the wire surface as well as on the surface formed by the cracks and gaps.

Optionally, another one or more further steps of coating with zinc and/or one or more further diffusion annealing processes can now follow, before the wire is drawn into its final dimension. It is possible for the wire to be drawn before, during or after one of the above cooling processes. The wire is preferably converted to the desired final dimension by cold drawing. As a result, further cracks can form in the block-like particles as well as the surrounding covering layer.

Through an appropriate choice of the total cross-section reduction during the usually multi-step cold drawing of the wire to the final dimension as well as through an appropriate choice of the cross-section reduction in each drawing step, the formation of a lamellar or net-like surface structure can be achieved, in which lamellae formed of the top layer, which contains predominantly zinc oxide, and lamellae formed of the material of the block-like particles are arranged next to each other in an alternating manner. The formation of such a surface structure is promoted by a total cross-section reduction by 60 to 85%. Furthermore, the formation of such a surface structure is promoted by a cross-section reduction in each drawing step by 8 to 12%.

The cold drawing can optionally be followed by a so-called stress-relief annealing, in order to have a positive influence on the straightness, the tensile strength and the stretching of the wire. The stress-relief annealing can be effected e.g. by resistance heating, inductively or by thermal radiation.

In a preferred embodiment, at least one covering layer is formed, which comprises the block-like particles according to the invention which are spatially separated, at least over a portion of their circumference, from each other, from the material of adjacent covering layers and/or the (adjacent) core material. Viewed in a wire cross section, perpendicular or parallel to the longitudinal axis of the wire, the predominant portion, i.e. amounting to more than approximately 50%, of the surface area (as defined above) of the block-like particles contains a copper-zinc alloy with a zinc concentration of preferably 38-49 wt.-% and more preferably 40-48 wt.-%, wherein this portion of the surface area lies in particular in the region of the block-like particles radially facing the core.

Preferably, the portion of this surface area is more than approximately 60%, more preferably more than approximately 80% and still more preferably approximately 100%.

In a further preferred embodiment, at least a partial quantity of the block-like particles (viewed in a wire cross section as defined herein) is completely spatially separated from each other, from the material of the layer which comprises these particles, the material of one or more further layers and/or the core material by cracks.

The copper-zinc alloys which contain the block-like particles preferably contain, in addition to Cu and Zn, one or more metals from the group of Mg, Al, Si, Mn, Fe, Sn with a total proportion of from 0.01 to 1 wt.-%. More preferably, the copper-zinc alloys which contain the block-like particles consist only of copper and zinc as well as unavoidable impurities.

In a further preferred embodiment, the outer covering layer comprises the block-like particles which are spatially separated, at least over a portion of their circumference, from each other, from the material of the adjacent covering layer and/or the (adjacent) core material. Viewed in a wire cross section, perpendicular or parallel to the longitudinal axis of the wire, the predominant portion of this embodiment, i.e. the portion of the surface area (as defined above) of the block-like particles amounting to more than 50% contains a copper-zinc alloy with a zinc concentration of 38-49 wt.-%, wherein this portion of the surface area lies in particular in the region of the block-like particles radially facing the core. According to the phase diagram for the CuZn system, the alloy is present in this portion of the surface area partially or predominantly as β and/or β' phase.

The portion of the surface area of the block-like particles amounting to less than 50% contains a copper-zinc alloy with a zinc concentration of more than 49-68 wt.-%. According to the phase diagram for the CuZn system, the alloy is present in this portion of the surface area as β+γ phase and/or as γ phase. The adjacent, inner covering layer contains a copper alloy with a zinc proportion of preferably 38-58 wt.-%. According to the phase diagram for the CuZn system, the alloy is present in this portion partially or predominantly as β phase or as β+γ phase. More preferably, the inner covering layer contains a copper-zinc alloy with a zinc proportion of 38-51 wt.-%. The adjoining layer differs from the outer covering layer through its topography, in that its boundaries to the outer covering layer as well as to the core or a further covering layer located underneath have an approximately wave-like shape. The adjoining, inner covering layer is preferably continuous. However, it can also have discontinuities, in which the core material or a further covering layer located underneath comes through.

In a further preferred embodiment, a further covering layer of a copper-zinc alloy, which preferably has a zinc concentration of 0.1-40 wt.-%, is arranged under the above-mentioned inner covering layer.

In a further multi-layered design, the covering can have, for example, an outer covering layer, preferably in the form of a top layer, forming a portion of the outer surface or the entire outer surface of the covering layer, which is formed of zinc, a zinc alloy or zinc oxide to an extent of at least 50 wt. % and preferably completely or substantially completely. The thickness of this top layer can be 0.05-1 μm. Such an outer covering layer is advantageous for the cutting performance as well as in the framework of fine-finishing processes with low discharge energies, as the zinc is then available more quickly.

Compared with a top layer of zinc oxide that is continuous over larger sections, the above lamellar or net-like structure has proved to be particularly suitable for increasing the cutting performance.

A thin overlay of zinc oxide is preferably formed through the second diffusion annealing, e.g. under ambient atmosphere, on the surfaces which form through the cracks which spatially separate the block-like particles, over a portion of their circumference, from each other, from the material of adjacent layers and/or the (adjacent) core material as well as on the surface formed by the cracks which the block-like particles themselves contain. Thus, in addition to the known top layer of zinc oxide, further zinc oxide is available to the eroding process for increasing removal.

It is preferred that the core is formed predominantly and preferably completely or substantially completely of copper or a copper-zinc alloy with a zinc content of from 2 to 40 wt.-%. Such cores are advantageously readily cold-formable.

The structure and the composition of the wire electrode according to the invention can be determined e.g. by means of a scanning electron microscopy (SEM) investigation with energy-dispersive X-ray spectroscopy (EDX). For this, the surface and a cross-section polish of the wire electrode are investigated. The production of a wire cross-section polish can be effected e.g. by the so-called ion beam slope cutting method, in which the wire is covered by a screen and irradiated with $Ar^+$ ions, wherein material is removed from portions of the wire protruding beyond the screen by the ions. Through this method, samples can be prepared free of mechanical deformations. The structure of the covering layer of the wire electrode according to the invention is thus retained through such a preparation. The structure of the covering layer of the wire electrode according to the invention can thus be represented by the SEM images. By means of point, line and surface EDX analyses, the composition of the wire electrode according to the invention can be determined.

The invention is explained in more detail in the following with reference to the drawings.

The wire electrode 1 shown in cross section in FIG. 1 has a wire core 2, which is completely surrounded by a covering 3, 4 forming the outside of the wire electrode 1. In the example embodiment represented, the core 2 is homogeneously completely or substantially completely formed of copper or a copper-zinc alloy with a zinc content of preferably from 2 to 40 wt. %. The outer covering layer 3, 4 comprises block-like particles which are spatially separated from each other or from the material 4 (e.g. by cracks (not shown)). The predominant, in terms of surface area, portion of the block-like particles contains a copper alloy with a zinc concentration of 38-49 wt.-%. According to the phase diagram for the CuZn system, the alloy is present in this portion partially or predominantly as β and/or β' phase.

The adjoining, inner covering layer region 4 consists of a copper alloy which has a zinc proportion of 38-51 wt.-%. According to the phase diagram for the CuZn system, the alloy is present in this portion partially or predominantly as β phase. This adjoining layer region can have a boundary to the core or a further covering layer (not shown) which has an approximately wave-like shape. The adjoining inner covering layer region is formed continuously over the circumference in this embodiment.

Figure 2:
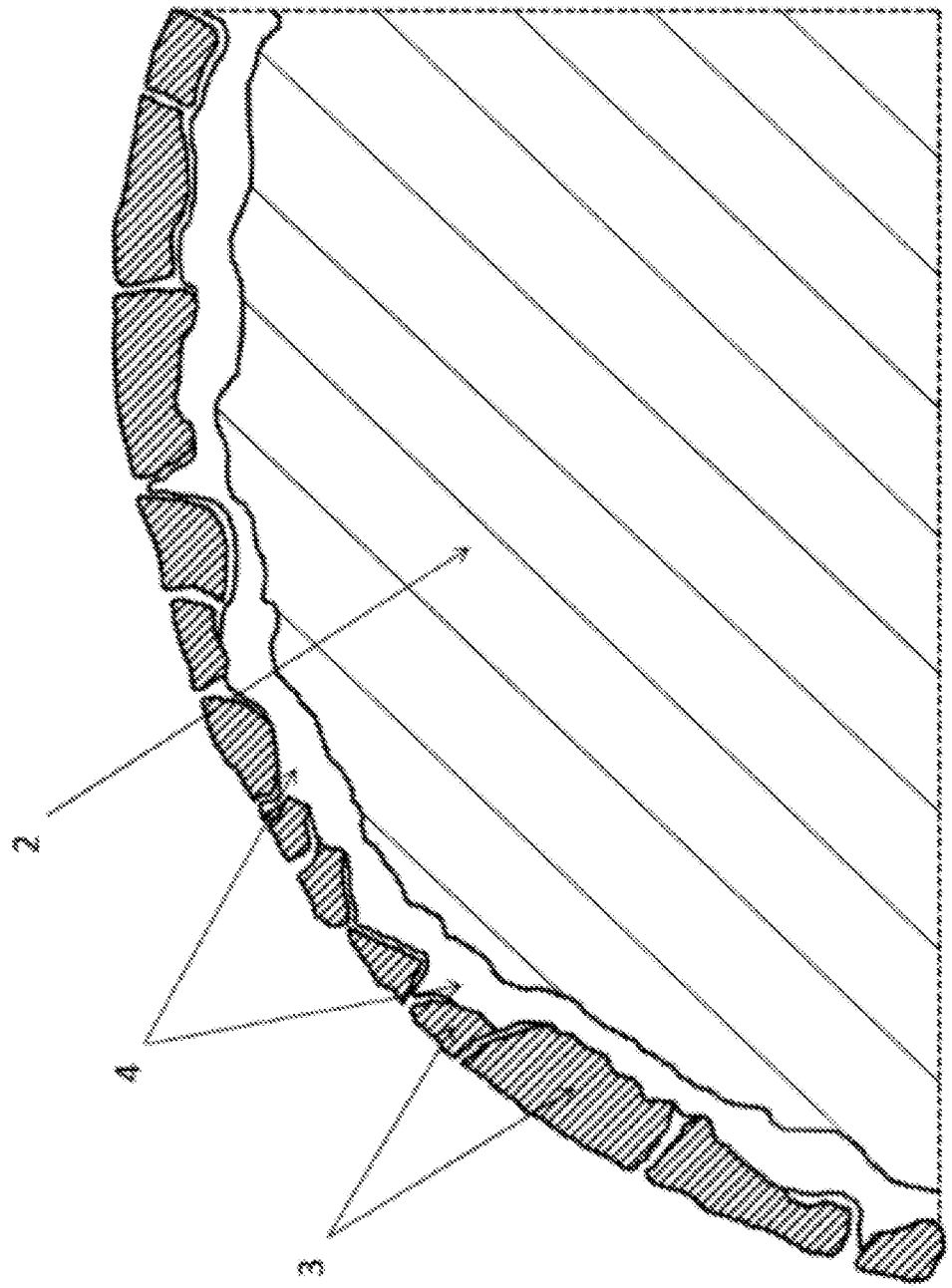
FIG. 2 shows a detailed cutout of the cross section of the first embodiment of the wire electrode 1 according to the invention according to FIG. 1.

FIG. 2 shows a detailed cutout of the cross section of the first embodiment of the wire electrode 1 according to the invention according to FIG. 1 with the wire core 2, and the outer covering layer 3, 4. The more precise shape of the block-like or block-shaped particles, the fact that they are separated, over a portion of their circumference or over their entire circumference (viewed in this cross section), from each other or from the adjoining material 4 of the covering layer by cracks, and the approximately wave-like boundary of the inner region 4 of the covering layer to the core 2 are recognizable.

Figure 3:
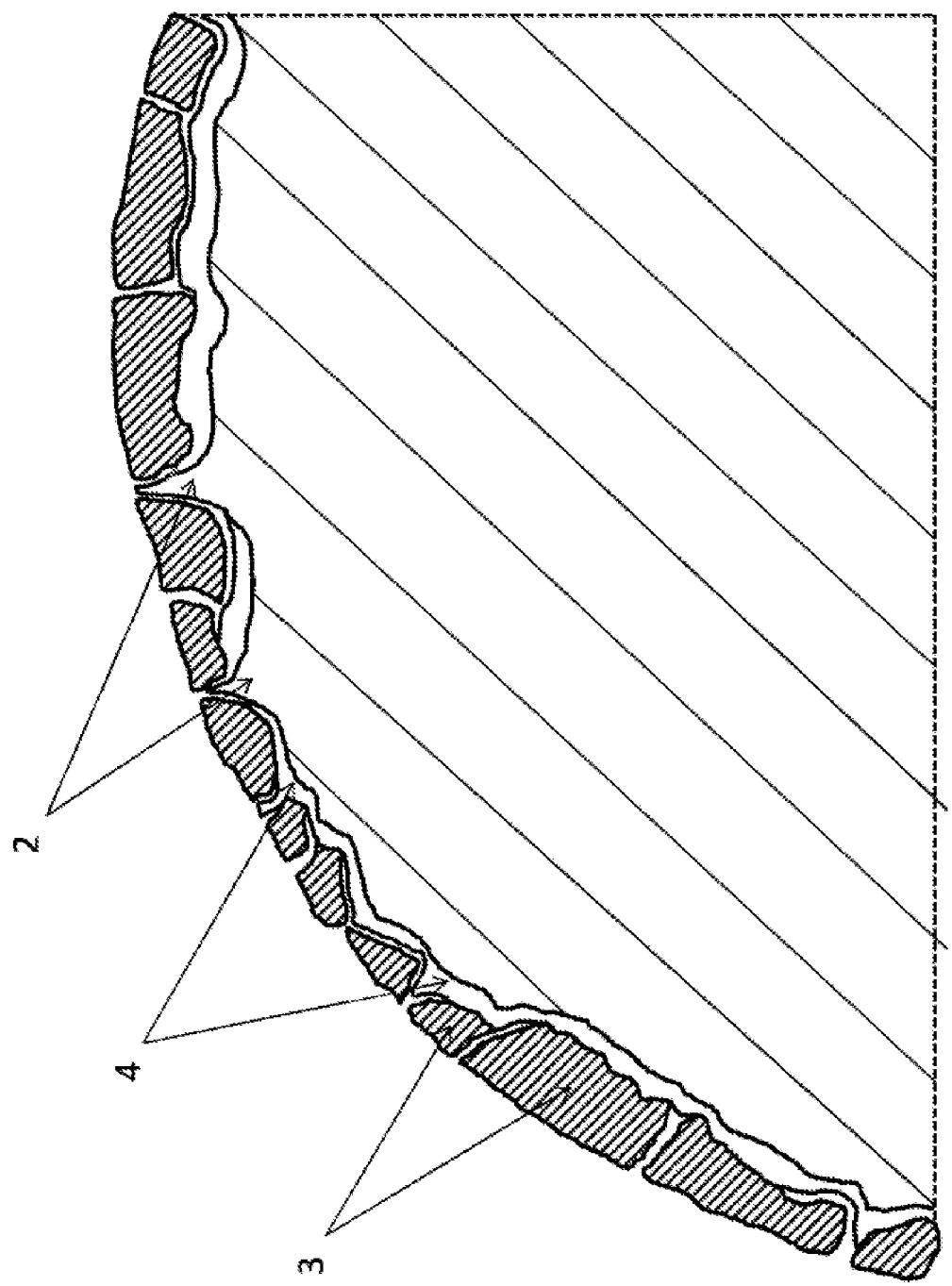
FIG. 3 shows a detailed cutout of a cross section (perpendicular to the longitudinal axis) of a second embodiment of the wire electrode according to the invention.

FIG. 3 shows a detailed cutout of the cross section of a second embodiment of the wire electrode according to the invention with the wire core 2 and the outer covering layer 3, 4. Unlike the first embodiment according to FIG. 2, the inner covering layer region 4 is discontinued at several points, whereby the core wire comes through at these points on the surface of the wire electrode.

Figure 4:
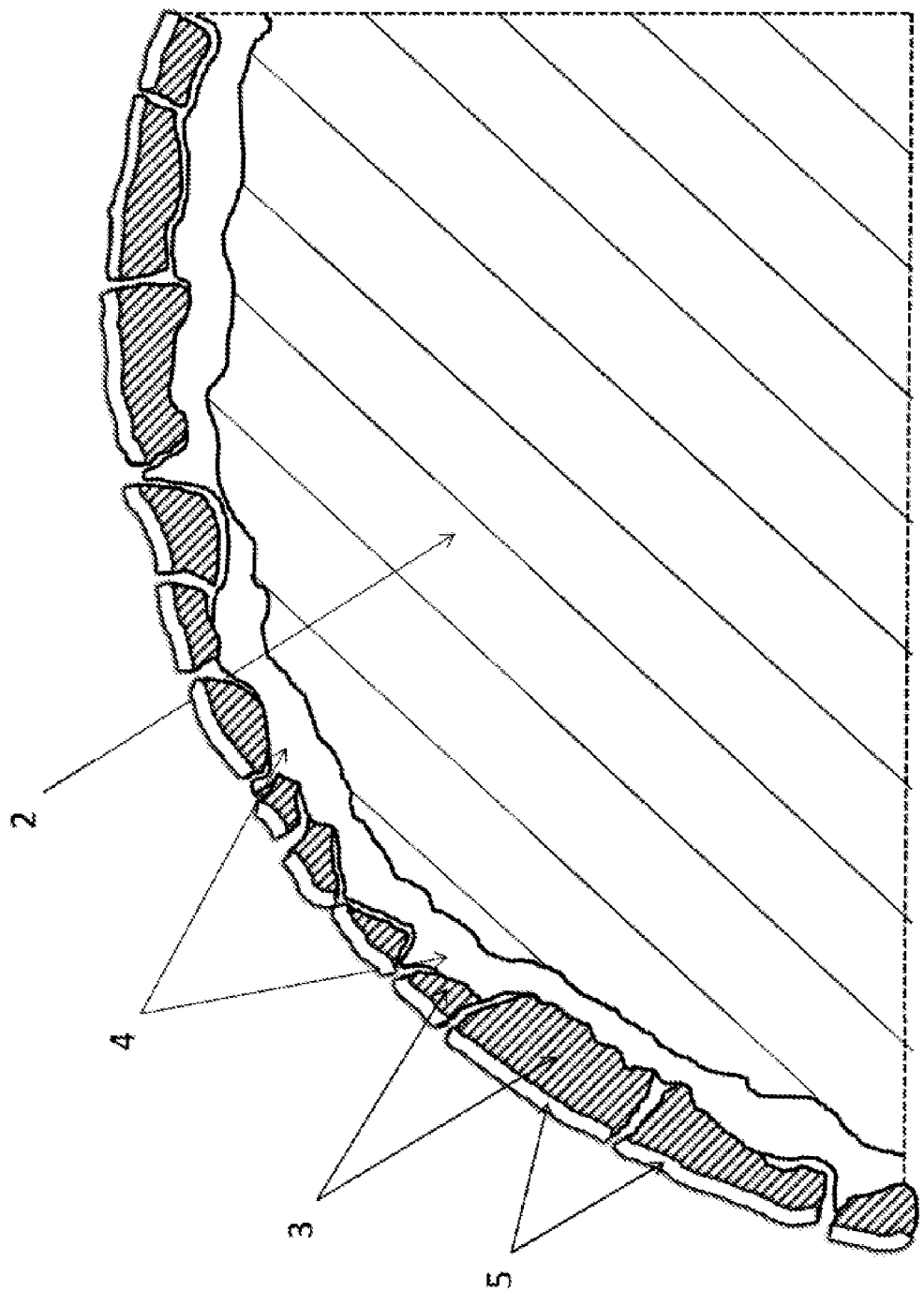
FIG. 4 shows a detailed cutout of a cross section (perpendicular to the longitudinal axis) of a third embodiment of the wire electrode according to the invention.

FIG. 4 shows a detailed cutout of the cross section of a third embodiment of the wire electrode according to the invention with the wire core 2 and the outer covering layer 3, 4, 5. The predominant, in terms of surface area, portion of the block-like particles consists of a copper-zinc alloy with a zinc concentration of 38-49 wt.-%, wherein this portion in this embodiment lies in the region of the block-like particles radially facing the core. According to the phase diagram for the CuZn system, the alloy is present in this portion partially or predominantly as β and/or β' phase. The outer region 5 of the block-like particles has a zinc content of more than 49-68 wt.-%. According to the phase diagram for the CuZn system, the alloy is present in this portion as β+γ phase and/or as γ phase.

Figure 5:
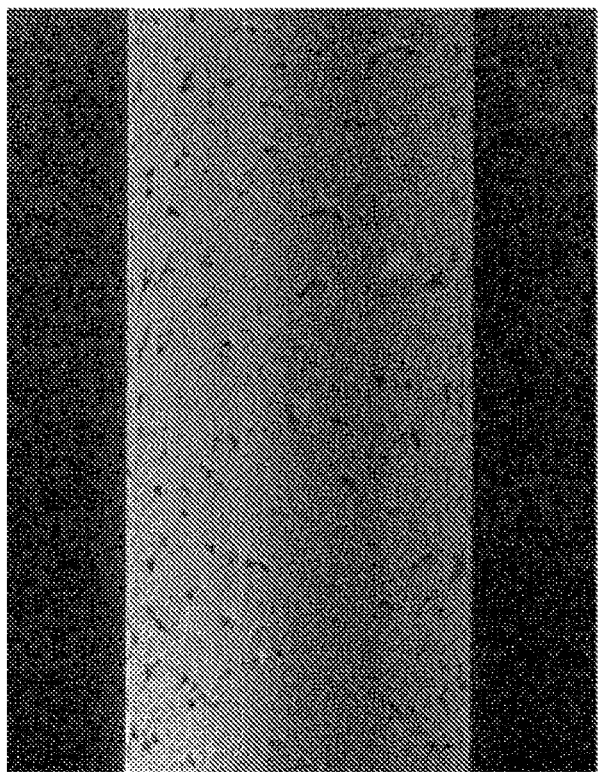
FIG. 5 shows a scanning electron microscopy (SEM) picture of the surface of the first embodiment of the wire electrode according to the invention.

FIG. 5 shows a scanning electron microscopy picture of the surface of the first embodiment of the wire electrode according to the invention. The block-like particles of the outer covering layer as well as cracks and indentations (gaps) are recognizable.

All of the embodiments represented in FIGS. 1 to 5 can have a thin top layer on the block-like particles (see FIG. 6), which forms a portion of or the entire outer surface of the covering layer 6. This layer is formed of zinc, a zinc alloy and zinc oxide to an extent of at least or more than 50 wt.-% or consists of zinc oxide. The thickness of this top layer is up to 0.05-1 µm or up to 2 µm. The top layer can have holes in which the material of the block-like particles emerges.

Figure 6:
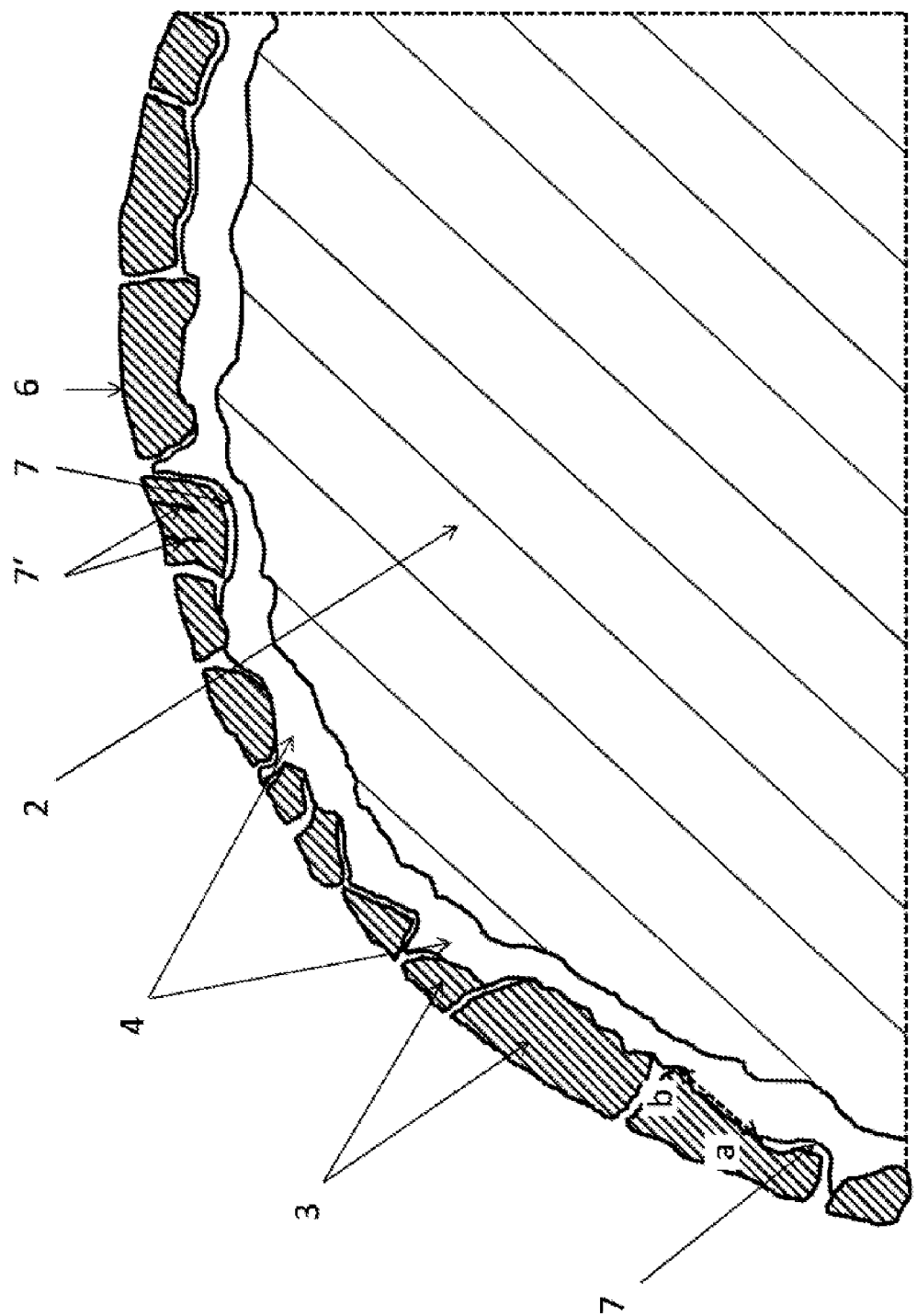
FIG. 6 shows a detailed cutout of a cross section (perpendicular to the longitudinal axis) of a fourth embodiment of the wire electrode according to the invention.

As depicted in FIG. 6, the block-like particles can contain zinc oxide along the cracks and gaps (7) which spatially separate them, at least over a portion of their circumference, from the material of adjacent layers and/or the adjacent core material, as well as along the cracks (7') which the block-like particles themselves contain. If, on the basis of a scanning electron microscopy analysis, in a cross section parallel or transverse to the longitudinal axis of the wire, a block-like particle is not completely delimited by cracks from the material of adjacent layers or the core material, to define the surface area of the block-like particle, it is to be necessary that it is delimited by the shortest straight connection between the end points (a, b), located closest to the wire centre in the radial direction, of the cracks (7) surrounding it (see FIG. 6).

Figure 7:
FIG. 7 shows an SEM picture (backscattered electrons 20 kV) of a cutout of the outer circumference of a wire electrode according to the invention in a cross section perpendicular to the longitudinal axis of the wire.

FIG. 7 is an SEM picture (backscattered electrons 20 kV) of a cutout of the outer circumference of a wire electrode according to the invention in a cross section perpendicular to the longitudinal axis of the wire. Block-shaped particles which are separated from each other by cracks at least over a portion of their circumference are recognizable. The straight connecting lines a-b and a'-b', respectively, illustrate how, in these cases, the surface area of the particles which contains a copper alloy with a zinc concentration of from 38 to 49 wt.-% to an extent of more than 50% is determined.

If a particle is not completely separated from its surroundings by cracks, the surface area is determined by choosing as the boundary the shortest straight connecting line between the ends, lying innermost in the radial direction towards the wire centre, of the cracks which separate the particle from the surroundings. For the particle that can be seen on the left in FIG. 7, this is the connecting line a-b, in accordance with the determination method already explained with reference to FIG. 6. The straight connection from one crack end to the "adjacent" (closest) crack end is thus chosen.

The particle on the right in the picture is separated from its surroundings towards the right by an indentation. In this case, the connecting line between the crack end and the radially innermost lying point of the closest indentation (gap) is chosen.

FIG. 8 and FIG. 9 show an SEM picture (backscattered electrons, 20 kV and 5 kV respectively) of the surface of a further embodiment of the wire electrode according to the invention with a magnification of 300 and 1000 respectively. By means of the colour contrast, regions with a lamellar structure (8) are recognizable. The lamellae which are formed of the material of the block-like particles appear as white, lighter regions. In contrast, the lamellae which are formed of the top layer which contains predominantly zinc oxide appear as grey, darker regions. The black regions represent cracks and indentations.

EXAMPLES

The advantages of the wire electrode according to the invention are explained in the following with reference to two embodiment examples in comparison with different wire electrodes according to the state of the art. The production of the wire samples was effected according to the sequences represented in the following:

Comparison Sample V1:
 Initial wire: CuZn37, d=1.20 mm
 Drawing to d=0.25 mm and stress-relief annealing Comparison Sample V2:
 Initial wire: CuZn37, d=1.20 mm
 Electrodeposition of zinc with 10 µm
 Drawing to d=0.50 mm
 Diffusion annealing in a hood-type furnace under ambient atmosphere at 400° C., 12 h
 Drawing to d=0.25 mm and stress-relief annealing Comparison Sample V3:
 Initial wire: CuZn37, d=1.20 mm
 Electrodeposition of zinc with 10 µm
 Drawing to d=0.50 mm
 Diffusion annealing in a hood-type furnace under ambient atmosphere at 180° C., 6 h
 Drawing to d=0.25 mm and stress-relief annealing Comparison Sample V4:
 Initial wire: CuZn20, d=1.20 mm
 Electrodeposition of zinc with 40 µm
 Drawing to d=0.60 mm
 First diffusion annealing in a hood-type furnace under ambient atmosphere at 180° C., 6 h
 Second diffusion annealing in a continuous pass under ambient atmosphere, heating rate >10° C./s, max. wire temperature 680° C., annealing time 15 s, cooling rate >10° C./s
 Drawing to d=0.25 mm and stress-relief annealing Sample E1 According to the Invention:
 Initial wire: CuZn37, d=1.20 mm
 Electrodeposition of zinc with 10 µm
 First diffusion annealing in a hood-type furnace under ambient atmosphere at 180° C., 6 h, average heating rate: 100° C./h, average cooling rate: 80° C./h
 Drawing to d=0.50 mm
 Second diffusion annealing in a hood-type furnace under ambient atmosphere at 400° C., 12 h, average heating rate: 160° C./h, average cooling rate: 140° C./h
 Drawing to d=0.25 mm and stress-relief annealing Sample E2 According to the Invention:
 Initial wire: CuZn37, d=1.20 mm
 Electrodeposition of zinc with 10 µm
 First diffusion annealing in a hood-type furnace under ambient atmosphere at 180° C., 6 h, average heating rate: 100° C./h, average cooling rate: 80° C./h
 Drawing to d=0.60 mm
 Second diffusion annealing in a hood-type furnace under ambient atmosphere at 400° C., 12 h, average heating rate: 160° C./h, average cooling rate: 140° C./h
 Drawing to d=0.25 mm and stress-relief annealing Sample E3 According to the Invention:
 Initial wire: CuZn37, d=1.20 mm
 Electrodeposition of zinc with 10 µm
 First diffusion annealing in a hood-type furnace under ambient atmosphere at 180° C., 6 h, average heating rate: 100° C./h, average cooling rate: 80° C./h
 Drawing to d=0.70 mm
 Second diffusion annealing in a hood-type furnace under ambient atmosphere at 410° C., 12 h, average heating rate: 160° C./h, average cooling rate: 140° C./h
 Drawing to d=0.25 mm with a cross-section reduction of 18% in each drawing step and subsequent stress-relief annealing Sample E4 According to the Invention:
 Initial wire: CuZn37, d=1.20 mm Electrodeposition of zinc with 10 μm First diffusion annealing in a hood-type furnace under ambient atmosphere at 180° C., 6 h, average heating rate: 100° C./h, average cooling rate: 80° C./h Drawing to d=0.40 mm Second diffusion annealing in a hood-type furnace under ambient atmosphere at 410° C., 12 h, average heating rate: 160° C./h, average cooling rate: 140° C./h Drawing to d=0.25 mm with a cross-section reduction of 10% in each drawing step and subsequent stress-relief annealing The relative cutting performances achieved with each wire electrode in the case of a spark-erosion machining in the main cut and in the case of a machining with a main cut and 3 trim cuts are indicated in Table 1. The spark-erosion machining was effected on a commercially available wire-eroding system with deionized water as dielectric. A 50-mm tall workpiece of hardened cold-worked steel of the X155CrVMo12-1 type was machined. A square with an edge length of 15 mm was chosen as cutting contour. A technology present on the machine side for bare brass wires with the composition CuZn37 was chosen as machining technology.

TABLE 1

| Wire sample | Diameter (mm) | Relative cutting performance in the main cut (%) | Relative cutting performance over the main cut and 3 trim cuts (%) |
|---|---|---|---|
| Comparison sample V1 | 0.25 | 100 | 100 |
| Comparison sample V2 | 0.25 | 108 | 110 |
| Comparison sample V3 | 0.25 | 110 | 112 |
| Comparison sample V4 | 0.25 | 119 | 124 |
| Sample E1 according to the invention | 0.25 | 143 | 126 |
| Sample E2 according to the invention | 0.25 | 140 | 128 |
| Sample E3 according to the invention | 0.25 | 137 | 124 |
| Sample E4 according to the invention | 0.25 | 142 | 128 |

The cutting performance achieved with comparison sample V1 in the main cut and, respectively, in the main cut and 3 trim cuts was set to 100% in each case. Comparison sample V2 has a continuously closed covering layer of β brass. Compared with comparison sample V1 the cutting performance is increased by 8% and 10% respectively. Comparison sample V3 has a covering layer which consists of block-like particles. The block-like particles consist predominantly of γ brass. With this comparison sample, the cutting performance compared with comparison sample V1 is increased by 10% and 12% respectively. Comparison sample V4 has an inner covering layer of β brass and an outer covering layer of a fine-grained phase mixture of β brass and γ brass. The thickness of the zinc layer on the initial wire of comparison sample 4 is four times larger than the thickness of the zinc layer on the starting wire of the comparison samples V2 and V3 as well as of the samples E1 and E2 according to the invention. With comparison sample V4, the cutting performance compared with comparison sample 1 is increased by 19% and 24% respectively.

The sample E1 according to the invention has a covering layer with an inner, continuous region of brass with a zinc content of 39-43 wt.-% and outwardly block-like particles, which are spatially separated, at least over a portion of their circumference, from each other or from the material of the covering layer by cracks and indentations (gaps), wherein these particles have a zinc content of 43-48 wt.-%.

The thickness of the block-like particles, measured in the radial direction on a wire cross section, is 5-11 μm. A portion of the covering layer is surrounded by a top layer which consists substantially completely of zinc oxide. The thickness of this top layer is 0.05-0.5 μm. Furthermore, the sample contains zinc oxide along the surface formed by the indentations (gaps) and cracks as well as on the surface which is formed by cracks which the block-like particles themselves contain. With the sample E1 according to the invention, the cutting performance compared with comparison sample 1 is increased by 43% and 26% respectively. Despite the identical zinc layer thickness after the electrodeposition coating on the starting material, the increase in the cutting performance in the case of this sample is much greater than in the case of comparison samples V2 and V3. The cutting performance is even higher than in the case of comparison sample V4, the zinc layer thickness of which is four times that of the sample E1 according to the invention.

The sample E2 according to the invention has a covering layer with an inner, continuous region of brass with a zinc content of 39-43 wt.-% and outwardly block-like particles, which are partially or completely spatially separated from each other or from the adjoining material of the covering layer by cracks and indentations (gaps), wherein these particles have a zinc content of 43-48 wt.-%. A portion of the outer surface of the covering layer is surrounded by a top layer which is formed substantially completely of zinc oxide. The thickness of this top layer is 0.05-0.5 μm. Furthermore, the sample contains zinc oxide along the surface formed by the gaps and cracks as well as on the surface which is formed by the cracks which the block-like particles themselves contain. Owing to the intermediate dimension (d=0.60 mm) which is larger compared with the sample E1 according to the invention, the first-produced covering layer of predominantly γ brass is less strongly torn and fissured. As the γ brass is converted to β brass in the second diffusion annealing process, the brittleness of the block-like particles is lowered, with the result that the surface structure of the sample E2 according to the invention is less fissured despite greater deformation in the second drawing process and the thickness of the block-like particles is more uniform. The thickness of the block-like particles, measured in the radial direction on a wire cross section, is 9-11 μm. With the sample E2 according to the invention, the cutting performance compared with comparison sample V1 is increased by 40% and 28% respectively.

The sample E3 according to the invention has a covering layer with an inner, continuous region of brass with a zinc content of 39-43 wt.-% and outwardly block-like particles, which are spatially separated, at least over a portion of their circumference, from each other or from the material of the covering layer by cracks and indentations (gaps), wherein these particles have a zinc content of 43-48 wt.-%. The thickness of the block-like particles, measured in the radial direction on a wire cross section, is 5-11 μm. A portion of the covering layer is surrounded by a top layer which consists predominantly of zinc oxide. The thickness of this top layer is 0.05-2 μm. Furthermore, the sample contains zinc oxide along the surface formed by the indentations (gaps) and cracks as well as on the surface which is formed by cracks which the block-like particles themselves contain. With the sample E3 according to the invention, the cutting performance compared with comparison sample 1 is increased by 37% and 24% respectively.

The sample E4 according to the invention has a covering layer with an inner, continuous region of brass with a zinc content of 39-43 wt.-% and outwardly block-like particles, which are partially or completely spatially separated from each other or from the adjoining material of the covering layer by cracks and indentations (gaps), wherein these particles have a zinc content of 43-48 wt.-%. A portion of the outer surface of the covering layer is surrounded by a top layer which is formed substantially completely of zinc oxide. The thickness of this top layer is 0.05-2 μm.

Owing to the cross-section reduction which is smaller compared with sample E3 during the final drawing process, the sample E4 has regions with a lamellar structure on the surface, such that lamellae formed of the top layer, which contains predominantly zinc oxide, and lamellae formed of the material of the block-like particles, which contain a copper-zinc alloy, are arranged next to each other in an alternating manner.

Furthermore, the sample E4 contains zinc oxide along the surface formed by the gaps and cracks as well as on the surface which is formed by the cracks which the block-like particles themselves contain. The thickness of the block-like particles, measured in the radial direction on a wire cross section, is 9-11 μm. With the sample E4 according to the invention, the cutting performance compared with comparison sample V1 is increased by 42% and 28% respectively.

Owing to the more uniform surface structure and thickness of the block-like particles, a better surface roughness compared with the samples E1 and E4 is achieved with the samples E2 and E3 according to the invention (see Table 2). The $R_a$ value is moreover smaller than in the case of the bare brass wire (V1).

TABLE 2

| Wire sample | Diameter (mm) | Surface roughness on the workpiece in $R_a$ (μm) |
|---|---|---|
| Comparison sample V1 | 0.25 | 0.30 |
| Comparison sample V2 | 0.25 | 0.31 |
| Comparison sample V3 | 0.25 | 0.25 |
| Comparison sample V4 | 0.25 | 0.43 |
| Sample E1 according to the invention | 0.25 | 0.32 |
| Sample E2 according to the invention | 0.25 | 0.25 |
| Sample E3 according to the invention | 0.25 | 0.25 |
| Sample E4 according to the invention | 0.25 | 0.33 |

The samples E1 to E4 according to the invention have a much smaller total thickness of the covering layer than sample V4. This promotes the straightness and bending stiffness of the wire electrode, with the result that the automatic threading processes proceed unimpeded on the eroding machines even under difficult conditions, such as e.g. tall workpieces.

Overall, the covering layer of the samples E1 to E4 according to the invention is more ductile and softer than the comparison samples V3 and V4 owing to the predominant or complete conversion of the γ brass to β brass, and thus behaves more abrasion-resistantly during running on a wire-eroding system, with the result that the process is less susceptible to disruptions or impairments due to deposits of wire wear debris.

Furthermore, a longer life of the wire guides and electrical contacts of the eroding machine is achieved through the covering layer which is more ductile and softer overall compared with the comparison samples V3 and V4.

REFERENCE NUMBERS

1: wire electrode
2: wire core
3: block-like particles
4: adjoining covering layer
5: outer region of the block-like particles
6: top layer
7: cracks surrounding the block-like particles
7': cracks inside the block-like particles
8: regions with a lamellar structure on the wire surface

CITED DOCUMENTS

U.S. Pat. No. 4,977,303
U.S. Pat. No. 5,945,010
U.S. Pat. No. 6,303,523
U.S. Pat. No. 7,723,635
EP-A2193876
EP-A1846189
EP-A2517817
EP-A1295664
EP-A1455981
KR-A10-2007-0075516

The invention claimed is:

1. A wire electrode for spark-erosion cutting having
a core comprising a material that contains a metal or a metal alloy, and
a covering, surrounding the core, the covering comprising one or more covering layers,
wherein the one or more covering layers comprises a covering layer material that has regions having a morphology that corresponds to block-like particles,
wherein the block-like particles are spatially separated, at least over a portion of the circumference of the block-like particles, from each other, from the covering layer material, or the core material by cracks,
wherein, when viewed in a wire cross section perpendicular or parallel to the wire longitudinal axis, more than 50% of the area of a region with the morphology of a block-like particle contains a copper-zinc alloy with a zinc concentration of from 38 to 49 wt.-%.

2. The wire electrode according to claim 1, wherein there is a top layer which consists of zinc oxide to an extent of more than 50 wt.-% in a thickness of 0.05-2 μm on the block-like particles, wherein this top layer has regions in which the copper-zinc alloys which are contained in the block-like particles come through on a surface of the wire.

3. The wire electrode according to claim 2, the block-like particles of which, viewed perpendicular to the wire surface, have regions with a lamellar structure, such that lamellae formed of the top layer, which consists of zinc oxide to an extent of more than 50 wt.-%, and lamellae formed of the material of the block-like particles are arranged succeeding each other in an alternating manner.

4. The wire electrode according to claim 3, in which the width of the lamellae which are formed of the material of the block-like particles is less than 5 μm.

5. The wire electrode according to claim 1, in which the metal is copper and the metal alloy is a copper-zinc alloy.

6. The wire electrode according to claim 1, in which the covering layer material and/or the core material emerges along the wire circumference between regions with the morphology of block-like particles.

7. The wire electrode according to claim 1, in which the portion, amounting to more than 50%, viewed in a wire cross section perpendicular or parallel to the wire axis, of the regions with the morphology of block-like particles, which contains a copper-zinc alloy with a zinc concentration of from 38 to 49 wt.-%, lies in the portion, radially facing the core, of the regions with the morphology of block-like particles.

8. The wire electrode according to claim 7, in which the portion, radially facing the core, of the regions with the morphology of block-like particles viewed in a wire cross section perpendicular or parallel to the wire axis is more than 60%.

9. The wire electrode according to claim 1, in which the portion, amounting to more than 50%, viewed in a wire cross section perpendicular or parallel to the wire axis, of the regions with the morphology of block-like particles contains a copper-zinc alloy with a zinc concentration of from 40 to 48 wt.-%.

10. The wire electrode according to claim 1, in which the portion, amounting to less than 50%, viewed in a wire cross section perpendicular or parallel to the wire axis, of the regions with the morphology of block-like particles contains a copper-zinc alloy with a zinc concentration of more than 49 to 68 wt.-%.

11. The wire electrode according to claim 1, in which the regions with the morphology of block-like particles contain one or more metals from the group of Mg, Al, Si, Mn, Fe, Sn with a total proportion of from 0.01 to 1 wt.-%, relative to the alloy material in these regions.

12. The wire electrode according to claim 1, in which the regions with the morphology of block-like particles, besides unavoidable impurities, consist only of copper and zinc.

13. The wire electrode according to claim 1, in which the extent of the regions with the morphology of block-like particles, measured in the radial direction of a wire cross section, is 1 to 30 μm.

14. The wire electrode according to claim 1, the covering of which comprises an inner covering layer region, which contains a copper-zinc alloy with a zinc proportion of from 38 to 58 wt.-%.

15. The wire electrode according to claim 14, in which, viewed in a wire cross section perpendicular to the wire axis, the boundary between the inner covering layer region of the layer which comprises the regions, the morphology of which corresponds to block-like particles, and the core or the boundary between the inner covering layer region and the one or more covering layers arranged between the core and the layer has a wave-like shape.

16. The wire electrode according to claim 14, in which the covering layer also has, in the inner region, discontinuities in which the core material or a further covering layer located underneath comes through in the direction of the outer wire region.

17. The wire electrode according to claim 1, the covering of which comprises an inner covering layer region, which contains a copper-zinc alloy with a zinc proportion of from 38 to 51 wt.-%.

18. The wire electrode according to claim 1, the covering of which has an outer covering layer, which consists of zinc, a zinc alloy or zinc oxide to an extent of at least 50 wt.-%.

19. The wire electrode according to claim 1, in which the regions with the morphology of block-like particles along the cracks which spatially separate the block-like particles from each other, over the portion of the circumference of the block-like particles, from the material of the layer which comprises these regions, the material of one or more further layers and/or the core material contain zinc oxide.

20. The wire electrode according to claim 1, in which the regions with the morphology of block-like particles have inner cracks.

21. The wire electrode according to claim 20, in which zinc oxide is present along the cracks.

22. The wire electrode according to claim 1, in which the core is formed of copper or a copper-zinc alloy with a zinc content of from 2 to 40 wt.-%.

23. A method for producing a wire electrode according to claim 1, in which the core containing copper or brass is coated with zinc in a first diameter, a wire with a brittle-hard covering layer, which covering layer consists predominantly of γ brass formed through a first diffusion annealing, this wire is drawn to a second diameter so that the layer of γ brass tears and regions form with the morphology corresponding to block-shaped particles that are spatially separated from each other, at least over the portion of the circumference of the block-like particles, from the material of the layer which comprises these regions, the material of one or more further layers and/or the core material by cracks, wherein, the wire is then subjected to a second diffusion annealing so that more than 50% of the regions with the morphology of block-like particles has a zinc content of from 38 to 49 wt.-%.

24. The method for producing a wire electrode according to claim 23, in which the wire is subjected to the second diffusion annealing in the presence of oxygen and a top layer which contains zinc oxide to an extent of more than 50 wt.-% forms on the block-like particles, then the wire is subjected to an optionally multi-step drawing process, wherein the top layer of zinc oxide tears and the material of the block-like particles emerges in the holes.

25. The method for producing a wire electrode according to claim 23, in which the first diffusion annealing is effected at an annealing temperature of 180-300° C. for 2-8 h with an average heating rate of at least 80° C./h and an average cooling rate of at least 60° C./h and the second diffusion annealing is effected at an annealing temperature of 300-520° C. for 4-24 h with an average heating rate of at least 100° C./h and a cooling rate of at least 80° C./h.

26. The method for producing a wire electrode according to claim 24, in which a total cross-section reduction of the wire in the range of from 60 to 85% is effected through the drawing process after the second diffusion annealing, wherein a cross-section reduction in the range of from 8 to 12% is effected in each drawing step if a multi-step drawing process is carried out.

* * * * *